Sept. 30, 1969   J. L. JOHNSON ET AL   3,470,399

LINEAR MOTOR VELOCITY DETECTION APPARATUS

Filed June 17, 1968   2 Sheets-Sheet 1

INVENTORS
JAMES L. JOHNSON
HAROLD C. STEPHENS

BY John H. Holcombe

ATTORNEY

United States Patent Office 3,470,399
Patented Sept. 30, 1969

3,470,399
LINEAR MOTOR VELOCITY DETECTION
APPARATUS
James L. Johnson and Harold C. Stephens, San Jose, Calif., assignors to International Business Machines Corporation, Armonk, N.Y., a corporation of New York
Filed June 17, 1968, Ser. No. 737,438
Int. Cl. H02k 41/02
U.S. Cl. 310—13       4 Claims

ABSTRACT OF THE DISCLOSURE

Velocity detection apparatus for use in a linear electric motor having a cylindrical center pole piece surrounded at one end by an outer pole piece to form a circular gap therebetween in which a movable, hollow cylindrical drive coil is inserted. The apparatus includes two cavities extending axially into the center pole piece. Two elongated permanent magnets are supported by the drive coil within the cavities and near the center of gravity of the drive coil assembly. Sensing coils are located in the cavities surrounding the magnets at the poles. The polarities of the two magnets are reversed and the coils are serially connected to cancel out electrical noise generated by the drive coil and by eddy currents induced in the center pole piece by the drive coil.

BACKGROUND OF THE INVENTION

Field of the invention

The invention relates to velocity detection means and more particularly to velocity detection means employing magnetic fields and magnetic sensing means.

Description of prior art

Prior art magnetic velocity detection means used with a linear motor generally have been a magnet attached to the exterior of the motor together with a coil which is attached to the object to be moved such that the coil surrounds a pole of the magnet. As the motor moves the object, the coil is likewise moved. The coil cuts the lines of flux emanating from the pole of the magnet and a voltage is supplied at the terminals of the coil. The amplitude of the voltage is proportional to the instantaneous velocity of the coil and hence of the object.

Although workable in many systems, the prior art velocity measuring means are not sufficiently accurate for use with short stroke, high velocity electric servo systems. An example of a linear electric motor for such a servo system is illustrated and described in copending application Ser. No. 716,968, "Data Storage Accessing Mechanism," L. R. Beach and R. J. Black, filed Mar. 28, 1968, and assigned in common with the present case.

In the example illustrated therein, the linear electric motor is employed for track accessing in a random access disk file. Random access disk files require the precise movement of a read/write head randomly between tracks across the surface of a disk. This requires movement of the head at velocities up to and exceeding 80 i.p.s. resulting in stopping the head in properly centered position over a track less than 0.005 in. in width. The accuracy required of the velocity detection apparatus for proper operation of such a system is in the order of 0.4 i.p.s. Prior art velocity detection means do not meet this requirement.

SUMMARY

An object of the present invention is to provide velocity detection apparatus of high accuracy over a broad range of speed and position and under high acceleration or deceleration.

Briefly, the invention comprises velocity sensing apparatus for an electric motor having an elongated center pole piece surrounded at one end by an outer pole piece to form a non-magnetic gap therebetween in which a movable, hollow drive coil is inserted. The velocity sensing apparatus comprises two cavities extending into the center pole piece longitudinally in a direction parallel to the direction of movement of the drive coil. Two elongated permanent magnets are fixedly supported with respect to the drive coil and are aligned with and located within the cavities and located near the line of force of the drive coil assembly. The permanent magnets each have a north and a south pole and the polarities of the permanent magnets are reversed. Sensing coils are fixedly located in the cavities and surround the poles of the magnets. The sensing coils are serially connected in a manner to cancel out eddy currents induced in the center pole piece by the drive coil.

DESCRIPTION OF THE PREFERRED EMBODIMENT

As discussed above, the prior velocity detection means are inadequate for use with linear electric motors employed for moving magnetic heads from track to track and data storage devices, such as disk files. Other examples of data storage devices include tape drives, drums and strip files. All such data storage devices employ various embodiments of apparatus including one or more transducers, a storage medium having a magnetizable surface and means for causing relative linear movement between the transducer or transducers and the storage medium to thereby read or write tracks thereon comprising linear strings of data.

Figure 1:
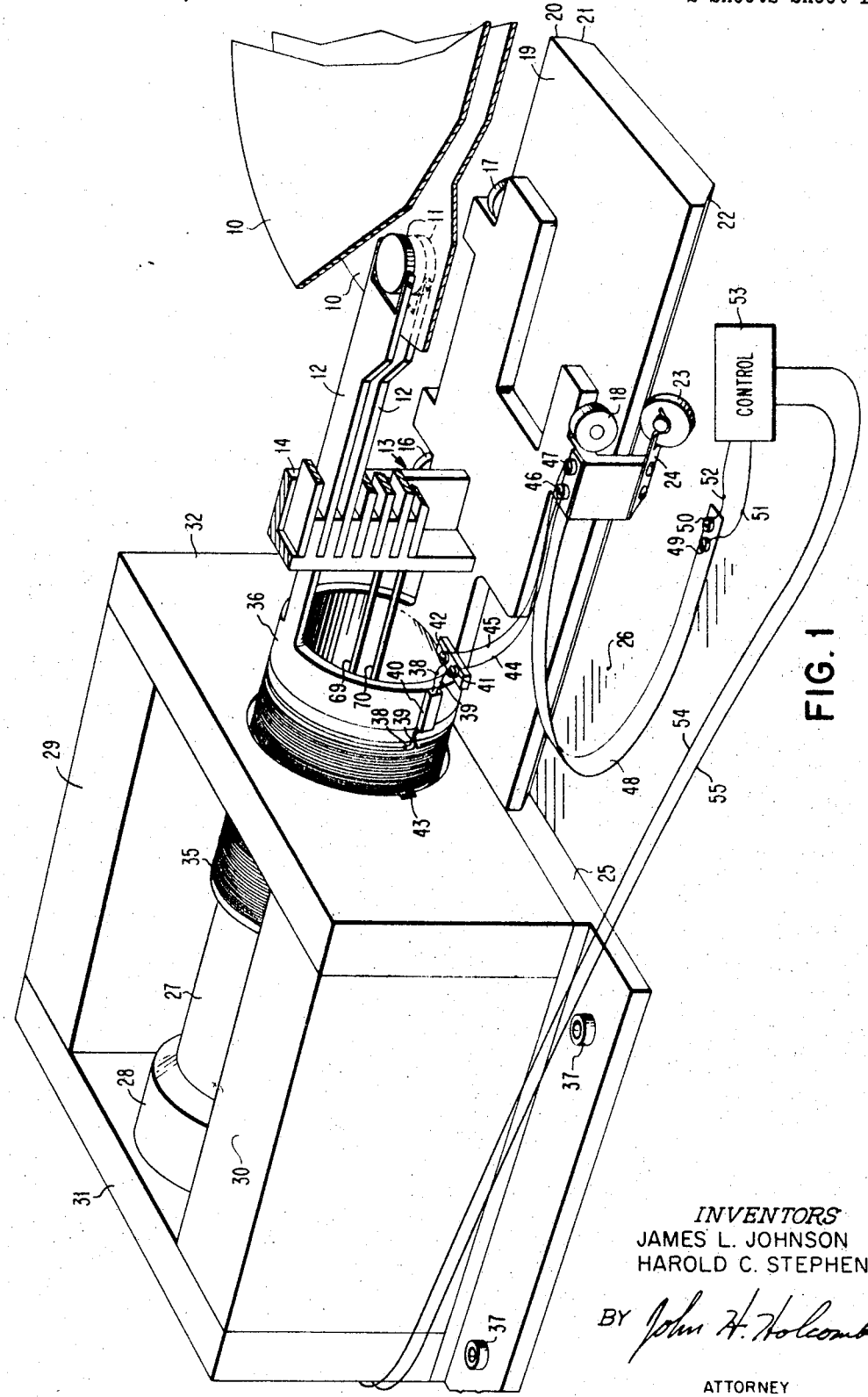
FIG. 1 is a perspective illustration of a linear electric motor and accessing assembly employing the velocity detection apparatus of the present invention.

An example of a linear electric motor employed with a data storage device is shown in FIG. 1. The storage medium of FIG. 1 is a disk file, comprising a plurality of flat, circular disks and having a magnetizable coating on each surface. Data may be stored or played back therefrom by means of transducers 11. The transducers cooperate with the magnetizable surface to convert electrical energy into a magnetic field and thereby permeate the magnetizable surface to record thereon, or to detect the magnetic fields emanating from previously recorded data and convert the detected magnetic fields into electrical signals. The transducers are mounted on arm assemblies 12 which, in turn, are mounted on a carriage assembly 13.

The carriage assembly 13 includes a vertical portion 14 which is shown partially cutaway. The vertical portion supports a plurality of the arm assemblies and transducers, only two of which are shown in their entirety. In a more common arrangement presently in use, either ten transducer and arm assemblies cooperate with five disks or twenty transducer and arm assemblies cooperate with ten disks.

The vertical portion 14 of the carriage assembly is fixedly mounted with respect to a base portion 15 of the carriage. The base portion 15 has three precision rollers 16–18, rotatably attached thereto. The rollers bear on a surface 19 of a baseplate 20. The surface 19 is precisely positioned with respect to the vertical location of the disk 10 and is maintained exactly parallel to the disk. Hence, the precise structure of the carriage assembly 13 and baseplate 20 assures that the transducers 11 will be precisely oriented with respect to the surfaces of the disk 10.

The rollers 16–18 are held against the surface 19 of baseplate 20 by means of rollers which ride on tapered surfaces 21 and 22 of the baseplate. A roller 23 is held against the tapered surface 22 by means of a spring 24 attached to the carriage assembly 13. The spring is adjusted so as to be maintained slightly deformed to thereby force the roller 23 into engagement with the tapered surface 22. A similar roller and spring arrangement is provided on the opposite side of the carriage assembly 13 to engage tapered surface 21 of the baseplate 20. The pressures exerted by these rollers force the rollers 16–18 into engagement with the surface 19 of the baseplate 20 and thereby maintain the precise alignment described.

The magnet structure of the present invention is fixedly mounted with respect to baseplate 20 and hence held in alignment therewith. A base 25 for the magnet structure is included which merely supports the magnet structure in a fixed relationship. The baseplate 20 for the carriage assembly 13 and the support 25 for the magnet structure are both supported by a common member 26.

The magnet structure of the linear electric motor includes a pole piece 27 made of magnetically permeable material, such as soft iron. In th example shown, the pole piece 27 is centrally located and is in the form of a cylinder having a base 28 of slightly larger diameter. The larger diameter is merely to increase the overall permeability of the central pole piece and is not necessary for operation.

Two permanent magnets 29 and 30 are arranged generally in parallel to the axis of cylindrical pole piece 27. The polarities of the two permanent magnets are the same. The south pole of each of the permanent magnets is connected to the base 28 of the cylindrical pole piece 27 by means of a rear pole piece 31. The rear pole piece is constructed of magnetically permeable material, such as soft iron.

The north polarity ends of the permanent magnets 29 and 30 are interconnected by means of a front pole piece 32. The front pole piece is also constructed of magnetically permeable material, such as soft iron. A hole 33 is cut in the central pole piece of radius larger than the radius of central pole piece 27, therby allowing the central pole piece to extend therethrough. The axes of the hole 33 and of the central pole piece 27 are aligned to form a substantially uniform gap therebetween.

The magnet structure is assembled by placing the pieces together, as shown, on base 25, aligning the cylindrical center pole piece 27 with respect to hole 33 and front pole piece 32, and fixedly mounting the assembly to baseplate 25.

An electric coil 35 is wound on a bobbin 36 in a nearly uniform manner over the length of the bobbin. The bobbin is of tubular shape, having an interior diameter slightly greater than that of cylindrical pole piece 27. The bobbin is thus adapted to fit over this cylindrical pole piece and, when actually aligned therewith, to be out of contact with the pole piece. Likewise, the outer diameter of bobbin 36 and the thickness of the winding of coil 35 are arranged to provide an overall outside diameter slightly less than the inner diameter of hole 33. Therefore, when actually aligned therewith, no frictional contact occurs therebetween.

The bobbin 36 in the example shown is constructed from a non-magnetic, non-conducting material such as a phenolic resin. The bobbin 36 is fixedly mounted with respect to carriage assembly 13. In the example shown, the bobbin 36 is aligned with and is fixedly attached to vertical portion 14 of the carriage assembly 13. As discussed above, the support plate 25 for the magnet assembly is placed on support surface 26 so that the assembly is accurately aligned with respect to the carriage baseplate 20. The magnet assembly is then firmly mounted in place by means of bolt 37.

As a result, subsequent mounting of the carriage assembly 13 on carriage base 20 establishes accurate alignment of bobbin 36 with respect to the axes of both cylindrical pole piece 27 and hole 33 of pole piece 32. The bobbin 36 and coil 35 thus move with mechanical freedom through the gap formed between the cylindrical pole piece 27 and the hole 33 of pole piece 32.

The wires 38, 39 comprising either end of coil 35 are routed through an insulator 40 to terminals 41, 42. The insulator 40 is fixedly attached to the outer surface of bobbin 36. A small notch 43 is cut in the front pole piece 32 to allow the insuator 40 to clear the front pole piece. This notch does not significantly affect the magnetic field in the gap.

Wires 44, 45 connect respectively terminals 41, 42 to terminals 46, 47. A flexible cable 48 comprising two conductors connects the terminals 46, 47 on carriage assembly 13 to, respectively, terminals 49, 50 which are fixedly attached to stationary support member 26. The flexible cable 48 is adapted to flex in accordance with any movement of the carriage assembly 13 with complete freedom. The terminals 49, 50 are connected by wires 51, 52 to a control source 53. The control source produces electrical energy which is transmitted over the named wires to provide a current in the coil 35 to control the operation of the described linear electric motor.

The magnetic fields emanated by the permanent magnets 29, 30 extend from the south pole thereof, through the rear pole piece 31, and into the center pole piece 27. The fields then extend from the center pole piece 27 radially into the gap between the pole piece and the front pole piece 32. The fields close themselves through the front pole piece 32 to the north pole of each of the magnets.

The resultant magnetic field extending radially across the gap between the center pole piece 27 and the front pole piece 32 thus intersects the portion of the coil 35 when in the gap in a perpendicular direction. Therefore, energization of the coil by means of a current from control 53 via the described connections interacts with the magnetic field in the gap to produce a substantial force acting on the coil in the axial direction. Whether the force is directed toward or away from the center of the disks 10 depends upon the direction of the current flow through the coil 35.

This force drives the carriage assembly 13 and bobbin 36 in the direction of the force as guided by the carriage baseplate 20.

Control 53 operates in accordance with known servo principles to move the array of heads 11 from one set of vertically spaced tracks to another set. A set of vertically spaced tracks having the same radius and being vertically aligned constitutes a "cylinder." Hence, accessing by the linear electric motor described constitutes moving the array of heads 11 from cylinder to cylinder.

Control 53 operates the electric motor in the "bang-bang" mode of operation similarly to that described in U.S. patent application Ser. No. 674,518, F. J. Sordello and C. R. Wilford, "Position-Control Servomechanism," filed Oct. 11, 1967, and assigned in common with the present case. In accordance with the described reference, control 53 first supplies to the drive coil 35 a current which will produce a force in the desired direction which thereby accelerates the carriage assembly, also in the desired direction. Before the array of transducers 11 reach the desired cylinder, control 53 reverses the direction of the current in the coil 35. This reversal exerts a force on the coil in the reverse direction. This force decelerates the carriage assembly 13 which continues in the desired direction, but at a continually decreasing speed, until coming to rest at the desired cylinder.

As described in that application, the point of switching from acceleration to deceleration is determined by comparing the velocity signal to the square root of the position error signal. Conceptually, the comparison represents the acceleration equation $V=\sqrt{2as}$, wherein V represents the velocity of the carriage assembly, s represents the distance from the desired position, and a represents the deceleration of the carriage assembly. The deceleration is assumed to be a constant since the acting reverse force of the motor is constant.

In a practical situation, the deceleration is usually constant, but not always the same constant. The value of the motor's force and, hence, the deceleration is dependent upon the efficiency of the motor. This efficiency in turn is dependent upon the environmental conditions, and the age and condition of the motor.

Hence, to compensate for these changes, the value of deceleration chosen for the comparison is less than that of an actual new motor. Therefore, the motor will actually decelerate the carriage assembly faster than the equation allows, thereby re-crossing the curve and causing control 53 to again accelerate the carriage assembly. The acceleration caused the curve to again be crossed so control 53 switches to deceleration. This alternate switching continues until the desired track is reached.

The switching between acceleration and deceleration is accomplished by reversing the direction of the current in the coil 35. These current reversals both generate electrical noise and induce eddy currents in the center pole piece 27.

As discussed above, the switching times are dependent upon a signal representing the velocity of the carriage assembly. Hence, the accuracy of that velocity signal is very important to the determination of proper switching times, especially as the carriage assembly nears the desired position.

The velocity detection apparatus of the present invention is arranged to provide that accuracy by cancelling or nearly eliminating the effects of mechanical vibration and electrical noise caused by rapid switching between acceleration and deceleration.

The voltage signal from the velocity detection apparatus of the present invention is provided to control 53 on wires 54, 55.

The velocity detection apparatus of the subject invention is best illustrated by reference to FIGS. 2 and 3.

Figure 2:
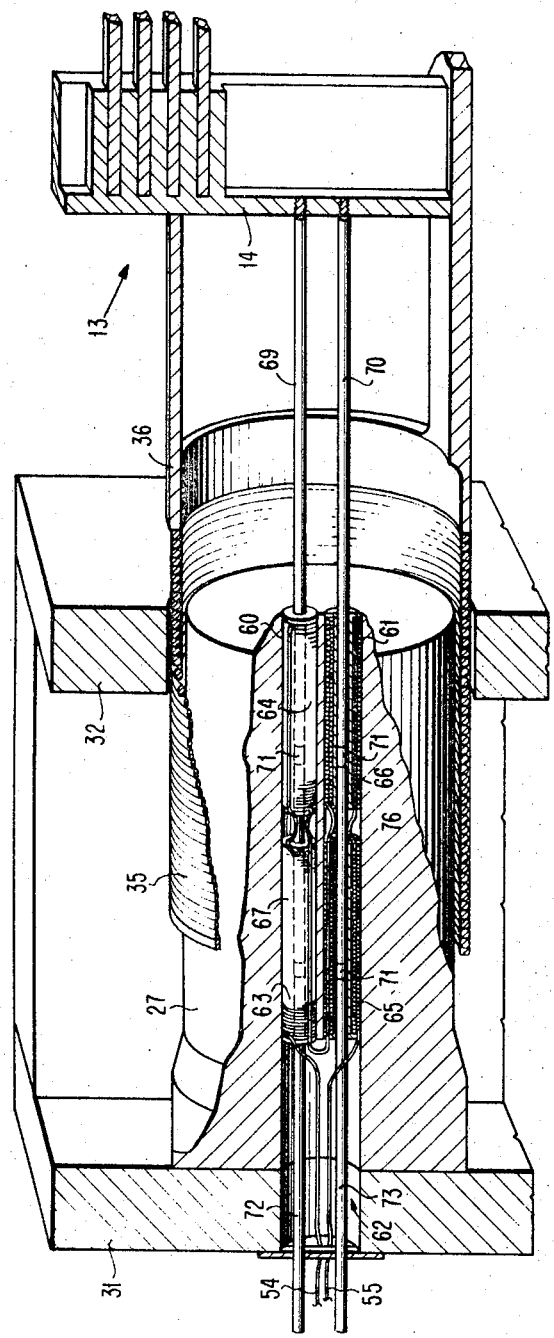
FIG. 2 is a perspective illustration of the velocity detection apparatus constructed in accordance with the present invention.

One embodiment of the invention is shown in FIG. 2. In that embodiment, two cylindrical holes 60, 61 extend axially into center pole piece 27 from the front face thereof. The holes open into a common cavity 62 which continues axially to the rear of the center pole piece 27 and through rear pole piece 31. Four electric coils, 63–66 are affixed within the holes 60, 61. Permanent magnets 67 and 68 are fixedly mounted with respect to the vertical portion 14 of the carriage assembly by means of aluminum support rods 69 and 70. The rods 69 and 70 are threaded at both ends so that they may be screwed into corresponding tap holes in vertical portion 14 of the carriage assembly.

The permanent magnets 67 and 68 each have a brass end cap 71 at each end thereof. The end caps have tapped holes therein, allowing the magnets to be screwed onto the outer ends of support rods 69 and 70. The permanent magnets are installed so as to be of reverse polarities. For example, the north pole of permanent magnet 67 is closest to support rod 69, and the south pole of permanent magnet 68 is closest to support rod 70. Additional aluminum support rods 72 and 73 are threaded and screwed into the permanent magnets to extend therefrom out through the cavity 62, where bearings may be provided for support thereof. Such support assures the maintenance of the linearity of the rod and magnet assemblies and prevents vibration thereof.

Figure 3:
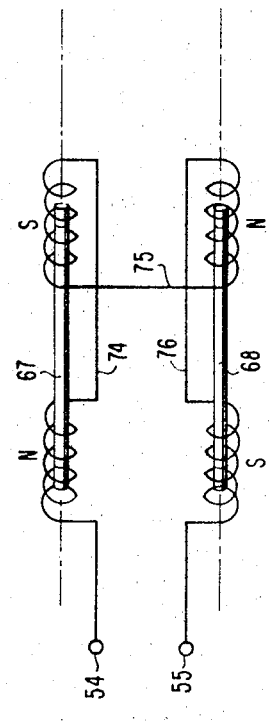
FIG. 3 is a schematic diagram of the electrical arrangement of the present invention.

The electrical wiring and connections of the subject invention is shown by reference to FIGS. 2 and 3. The output wires from the coils to control 53 of FIG. 1 comprise wires 54 and 55. Wire 54 is connected to coil 63 within which is positioned the south pole of permanent magnet 67. All of the coils 63–66 are wound in the same direction about the corresponding permanent magnet. Hence, to attain an additive serial relationship, the connections between the coils are made as shown.

A wire 74 connects the right end of coil 63 to the right end of coil 64. Coil 64 is wound in the same direction as coil 63 and encloses the north pole of permanent magnet 67. The left end of coil 64 is connected to wire 75 which is strung to the left end of coil 66. Coil 66 is again wound in the same direction and encloses the south pole of permanent magnet 68. The right end of coil 66 is connected by means of wire 76 to the right end of coil 65. Coil 65 is also wound in the same direction and encloses the north pole of permanent magnet 68. The left end of coil 65 is connected to output wire 55 and thereby to control 53.

In operation, the disclosed magnetic and wiring arrangement cancels both the high frequency electrical noise generated by the switching of the current in the drive coil 35 and the low frequency electrical noise generated by the eddy currents in the center pole piece 27.

The magnets 67 and 68 each product a magnetic field which extends from the respective poles of the magnet into the center pole piece and loops back to the opposite pole of the magnet. When a current is provided by control 53 to the drive coil 35, the current in the coil coacts with the magnetic field in the gap between the center pole piece 27 and the front pole piece 32. The coaction between the current in coil 35 and the magnetic field in the gap produces a force on the coil which in turn tends to move the coil, the bobbin 36 and the entire carriage assembly 13 axially along center pole piece 27. The permanent magnets 67 and 68 are attached to the vertical portion of the carriage assembly by means of aluminum support rods 69 and 70. Hence, the motion imparted to the carriage assembly 13 is likewise imparted to the permanent magnets 67 and 68.

As the magnets 67 and 68 move, the magnetic fields produced thereby likewise are moved. The movement of the magnetic fields, which extend through the respective coils 63–66, induces a voltage across each of the coils. The voltage induced is directly proportional to the speed of movement of the permanent magnets.

With the wiring arranged as described, the voltage in each of the coils adds to the voltage of the other coils so that the resultant voltage and therefore current supplied to control 53 is of high amplitude. This amplitude is directly proportional to the velocity of the carriage assembly 13 and, hence, is indicative to the control of that velocity.

As discussed previously, the velocity input to the control 53 is continually compared therein to a function of the position error. When the velocity signal becomes greater than that function, the control reverses the direction of the current in coil 35. The reverse current generates a force in the coil now of the reverse direction. This force causes a deceleration of the carriage assembly 13. The point at which the current in the coil 35 is reversed by control 53 must be very precise. Likewise, subsequent switching between acceleration and deceleration must be very precise. These points are controlled by the voltage generated between lines 54 and 55 by coils 63–66. Hence, the elimination of an effect thereon from current in coil 35 is extremely valuable to maintain the required accuracy. Likewise, the arrangement of the coils in serial arrangement to provide a high amplitude thereby increases the signal to noise ratio to also provide high accuracy.

In addition, the aluminum support rods 69 and 70 are attached to vertical portion 14 of carriage assembly 13 at approximately the center of gravity of the total assembly, including coil 35. Attachment near to and symmetrically spaced from the center of gravity tends to prevent vibration of the assembly by the reversing forces from affecting the accuracy of the apparatus.

As a result, the arrangement of the subject invention to cancel the effect of any external magnetic or electric fields and mechanical vibration, and to provide a high amplitude signal relative to any noise that may be generated contributes significantly to the required degree of accuracy.

Many changes to the embodiment of the subject invention as illustrated may easily be made. For example, the individual holes 60 and 61 may instead be a common opening similar to cavity 62 which extends entirely through the center pole piece 27, and the coils 63–66 supported in position by other means. Similarly, the coils 63–66 need not all be wound in the same direction, but rather may be wound differently, with appropriate changes in the connecting wiring 74–76.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. In a positioning means which converts electrical energy into linear mechanical motion, said positioning means including a first pole piece terminating in an extended portion, a second pole piece terminating in an opening substantially surrounding part of said extended portion to form a non-magnetic gap therebetween, magnet means to generate a magnetic field, the lines of flux of which are directed by said pole pieces to extend across said non-magnetic gap, and an electric drive coil wound so as to substantially conform to said non-magnetic gap and arranged to be movable through said non-magnetic gap, whereby application of electric current through said drive coil generates a force thereon at said gap tending to move said coil along said gap, velocity sensing apparatus for sensing the velocity of said drive coil with respect to said first pole piece comprising:

two elongated magnets fixedly supported with respect to said drive coil so that the longitudinal dimension of each said magnet is parallel to the direction of movement of said drive coil, the polarities of said magnets being oppositely disposed, and at least one of the poles of each said magnet being disposed within an opening in said first pole piece; and sensing coils fixedly disposed within said first pole piece for sensing the velocity of each of said magnets, said sensing coils being serially connected in a manner to essentially cancel noise generated by said drive coil.

2. The apparatus of claim 1 wherein:
said magnets are supported with respect to said coil from points near and symmetrically displaced from the center of gravity of said drive coil, said magnets each having a north and a south pole at opposite ends thereof, the relative polarities of said magnets being reversed, and both said poles of each said magnet being disposed within an opening in said first pole piece, whereby said first pole piece serves as a partial magnetic path for the magnetic fields generated by said magnets.

3. The apparatus of claim 2 wherein:
said sensing coils are fixedly disposed within said first pole piece for sensing the velocity of each of said poles of said magnets, said sensing coils being connected in series and wound so as to essentially cancel noise generated by said drive coil and generated by noise from eddy currents induced by said drive coil and so as to provide additive electrical signals indicating the velocity of movement of said drive coil.

4. The apparatus of claim 1 including:
two cavities in said extended portion of said first pole piece which extend longitudinally into said first pole piece in a direction parallel to the direction of movement of said drive coil;

two permanent magnets fixedly supported with respect to the drive coil, aligned with said cavities and disposed near the center of force of said drive coil, said permanent magnets each having a north and a south pole, the relative polarities of said permanent magnets being reversed, said permanent magnets also being disposed within said cavities so said first pole piece acts as a partial magnetic path for the magnetic fields generated by said permanent magnets; and sensing coils fixedly disposed within said cavities for sensing the velocity of each of said permanent magnets, said sensing coils being connected in series and wound so as to essentially cancel electrical noise generated therein by eddy currents induced by said drive coil and so as to provide additive electrical signals indicating the velocity of movement of said drive coil.

References Cited

UNITED STATES PATENTS

| 2,289,962 | 7/1942 | Hancock | 310—27 |
| 2,296,754 | 9/1942 | Wolf et al. | 310—25 X |
| 3,133,214 | 5/1964 | Lawson et al. | 310—15 |
| 3,260,870 | 7/1966 | Beach et al. | 310—14 |

MILTON O. HIRSHFIELD, Primary Examiner

D. F. DUGGAN, Assistant Examiner

U.S. Cl. X.R.

310—27; 340—17